United States Patent [19]

Irving et al.

[11] Patent Number: 4,836,878
[45] Date of Patent: Jun. 6, 1989

[54] METHOD OF ADHERING TWO SURFACES WITH AN ANAEROBICALLY POLYMERIZABLE ACRYLIC ESTER COMPOSITION

[75] Inventors: Edward Irving, Burwell; Terence J. Smith, Melbourn, both of England

[73] Assignee: Ciba-Geigy Corporation, Ardsley, N.Y.

[21] Appl. No.: 176,578

[22] Filed: Apr. 1, 1988

Related U.S. Application Data

[60] Division of Ser. No. 933,295, Nov. 20, 1986, Pat. No. 4,755,751, which is a continuation of Ser. No. 724,425, Apr. 18, 1985, abandoned.

[30] Foreign Application Priority Data

Apr. 28, 1984 [GB] United Kingdom ............... 8410959

[51] Int. Cl.$^4$ ........................ C09J 5/02; C08L 33/08; C08L 33/10; C08L 63/02
[52] U.S. Cl. ................... 156/307.3; 156/330; 525/532; 523/176
[58] Field of Search ............... 525/530, 531, 532; 523/176; 156/307.3, 330

[56] References Cited

U.S. PATENT DOCUMENTS

| 3,508,951 | 4/1980 | Shimp et al. | 164/43 |
|---|---|---|---|
| 3,986,546 | 10/1976 | Green et al. | 164/43 |
| 4,160,178 | 7/1979 | Smith et al. | 428/475.8 |
| 4,374,963 | 2/1983 | Morgan et al. | 525/486 |
| 4,383,090 | 5/1983 | Slocki et al. | 525/502 |
| 4,412,048 | 10/1983 | Dixon et al. | 525/524 |

FOREIGN PATENT DOCUMENTS 0096906 12/1983 European Pat. Off.
1460571 1/1977 United Kingdom.

Primary Examiner—Lewis T. Jacobs
Assistant Examiner—Robert E. L. Sellers, II
Attorney, Agent, or Firm—Luther A. R. Hall

[57] ABSTRACT

Curable compositions, especially suitable for use as adhesives, contain
(A) an anaerobically polymerizable mixture which is stable in oxygen but polymerizes when oxygen is excluded, comprising
  (i) a free radical polymerizable compound, such as an acrylate or methacrylate ester,
  (ii) an organic free radical initiator, such as a peroxide or hydroperoxide, and
  (iii) an organic accelerator of free radical polymerization
(B) an epoxide resin, and
(C) a curing agent for epoxide resins that is a basic curing agent, a polymercaptan, or a polyhydric phenol.

These compositions cure rapidly by an araerobic curing mechanism and then develop high strength by cure of the epoxide resin.

2 Claims, No Drawings

METHOD OF ADHERING TWO SURFACES WITH AN ANAEROBICALLY POLYMERIZABLE ACRYLIC ESTER COMPOSITION

This is a divisional of application Ser. No. 933,295, filed on Nov. 20, 1986, now U.S. Pat. No. 4,755,751, which is a continuation of application Ser. No. 724,425 filed on Apr. 18, 1985, now abandoned.

This invention relates to curable compositions, particularly to compositions suitable for use as adhesives and to their use in fixing surfaces together.

A wide range of adhesives is currently available for a variety of bonding operations. However where a high strength, durable adhesive is required, a so-called 'structural adhesive', there are drawbacks to every system currently available, so that a choice can be made only after balancing the advantages and disadvantages of each system against those of other systems.

Epoxy resins offer the advantages of excellent adhesion, durability, water and chemical resistance, and high heat resistance. They suffer from the disadvantage of being slow to cure, unless heated to a moderately high temperature. This long curing time is a limiting factor to their use in, for example, production lines for cars or electrical goods. Acrylic-based adhesives, cured by free-radical addition reactions, have the advantage of a very fast cure, but their ultimate strengths and resistance to heat, water, and chemicals are often inferior to those of other adhesives.

Anaerobic adhesives, which are generally based on a polymerisable acrylic material, are intended to polymerise spontaneously in the absence of oxygen but remain storage stable for prolonged periods when oxygen is present. Such adhesives offer the advantage, when compared with other types of acrylic adhesives, of being available as one-part formulations, requiring no further mixing before use. Most other acrylic adhesives are marketed with the free radical hardener in a separate container from the resin since cure commences as soon as they are mixed. Such formulations must be used by applying the resin to one surface and the free radical initiator to another surface, and bringing the two surfaces together. Other acrylic adhesives contain inhibitors which interfere with the action of the free radical hardener so that a stable mixture of resin and hardener can be prepared. Such mixtures commence to cure only when contacted with a catalyst or co-catalyst initiator, such as an aldehydeamine reaction product. These initiators are generally applied to one surface to be bonded, and the stabilised acrylic-free radical hardener mixture is applied to the other. Cure occurs rapidly once the two surfaces are brought together. Again therefore, a two-part formulation is required.

Anaerobic adhesives do not develop particularly high ultimate strengths, being, in general, weaker than these two-part acrylic adhesives. Their practical use is virtually limited to gasket formation and the locking of nuts onto bolts where it is essential that the parts can be separated again if desired.

There is a need for a high strength, durable adhesive that has the advantages of rapid cure and ease of application without the drawback of requiring to be applied as two separate compositions to the mating surfaces. It has now been found that these requirements can be met by compositions containing an anaerobically-curable, usually acrylic ester-based formulation, i.e. one that is stable in the presence of oxygen but cures rapidly once oxygen is excluded, together with an epoxide resin and a certain type of hardener. As is well known in epoxide resin technology, the hardener may be one that commences curing as soon as it is mixed with the resin or it may be one that commences curing only when a certain threshold temperature is exceeded, i.e. a latent hardener.

Adhesive compositions containing both an acrylate and an epoxide resin are not inherently novel. British Patent Specification No. 2,110,705A, for example, describes a polymerisable mixture comprising an acrylic-based material, a polymerisable epoxide-based material, and a bifunctional compound that can react with both materials. Such mixtures are applied to one surface and an initiator and/or catalyst is applied to another surface, cure commencing immediately the two surfaces are brought into contact, since the acrylic polymerisation system, namely the mixture of acrylic monomer, initiator and accelerator, is not stable, even in the presence of oxygen, that is, is not anaerobic. The preparation of a stable adhesive formulation containing all of the components described in that specification would be impossible.

Compositions containing both an anaerobically-curing mixture and an epoxide resin are disclosed in U.S. Pat. No. 4,160,178. This patent describes a method for impregnating electrical equipment with a resinous material, and curing it, by applying a mixture of an aliphatic polyacrylic resin, an aliphatic monoacrylic resin, an epoxide resin, an aromatic vinyl monomer, and an anhydride in the weight ratio 10:0-20:0.1-100:0-120:0-60, together with an organic free radical reaction stabilizer, free radical initiator, free radical accelerator, and co-accelerator, and contacting this mixture with an inert diffusion gas such as nitrogen to displace dissolved oxygen. It is stated that displacement of dissolved oxygen is a necessary feature of the process. Removal of dissolved oxygen by application of a vacuum does not have the same effect. By implication, were such a mixture to be confined between two impermeable mating surfaces, dissolved oxygen would prevent anaerobic cure from taking place.

These references do not therefore teach an adhesive formulation that is storage stable in oxygen and cures rapidly when confined within two impermeable mating surfaces and which may be further cured by heat to an ultimate bond strength that is similar to that of a conventional epoxide resin formulation.

Accordingly, this invention provides a curable composition comprising (A) an anaerobically polymerisable mixture which is stable in oxygen but polymerises when oxygen is excluded and which comprises
  (i) a free radical-polymerisable compound,
  (ii) an organic free radical initiator, and
  (iii) an organic accelerator of free radical polymerisation, (B) an epoxide resin, and (C) a curing agent for epoxide resins which is a basic curing agent, a polymercaptan or a polyhydric phenol.

Anaerobically polymerisable mixtures, which are stable in oxygen but polymerise when oxygen is excluded, are well known and have been commercially available for many years as anaerobic adhesives. For such mixtures, the combination of polymerisable compound (i), initiator (ii) and accelerator (iii) is chosen to given the desired anaerobic properties.

The polymerisable compound (i) is usually an acrylic ester, in particular a compound containing at least two groups of formula

  I where $R^1$ represents a hydrogen or chlorine atom, or a methyl or ethyl group.

Suitable esters having at least two groups of formula I include esters, especially acrylates and methacrylates of aliphatic, cycloaliphatic, alicyclylaliphatic, araliphatic or heterocyclylaliphatic polyhydric alcohols, especially diols and triols; polyhydroxy-, particularly dihydroxy-, carboxylic acids; polyhydroxy-, particularly dihydroxy-, alkylamines; and polyhydroxy-, particularly dihydroxy-, alkylnitriles. Acrylic ester-urethanes and -ureides may also be used. Such esters are, in general, commercially available, and any that are not may be prepared by known methods.

Suitable acrylic esters include those of formula

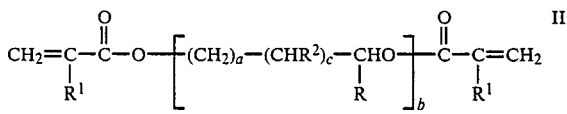 II where $R^1$ is as hereinbefore defined,

R denotes H, $-CH_3$, $-C_2H_5$, $-CH_2OH$, or $-CH_2O-\overset{\overset{O}{\|}}{C}-\underset{\underset{R^1}{|}}{C}=CH_2$, $R^2$ denotes H, OH, or $-O\overset{\overset{O}{\|}}{C}C-\underset{\underset{R^1}{|}}{C}=CH_2$, a is an integer of from 1 to 8,
b is an integer of from 1 to 20, and
c is zero or 1.

Among compounds of formula II, those where a is from 1 to 4 b is from 1 to 5 and $R^1$ denotes a hydrogen atom or a methyl group are preferred. Specific examples of such compounds are the diacrylates and dimethacrylates of ethylene glycol, propylene glycol, butane-1,4-diol, diethylene glycol, dipropylene glycol, triethylene glycol, tripropylene glycol, tetraethylene glycol, tetrapropylene glycol, and polyethylene and polypropylene glycols having average molecular weights within the range 200-1000.

Other suitable acrylic esters are of formula

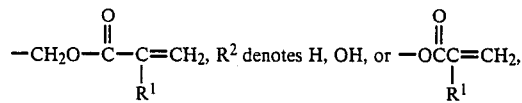 III where
b, c, $R^1$ and $R^2$ have the meanings assigned above, d is zero or a positive integer, provided that c and d are not both zero,
e is 2, 3, or 4, and
$R^3$ denotes an organic radical of valency e linked through a carbon atom or carbon atoms thereof to the indicated b oxygen atoms.

Preferred among compounds of formula III are those where b, c and d are each 1, $R^1$ is a hydrogen atom or methyl group and $R^3$ is a hydrocarbon residue of an aliphatic polyhydric alcohol having from 2 to 6 carbon atoms, such as a pentaerythrityl group. A specific example of such compounds is pentaerythrityl tetrakis (dimethylene glycol acrylate).

Yet other suitable esters are those of formula

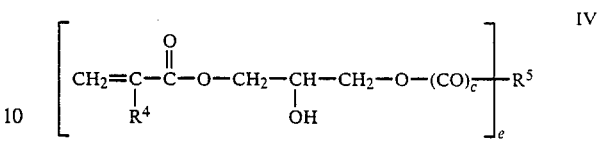 IV where
c and e have the meanings previously assigned,
$R^4$ denotes $-H$ or $-CH_3$, and
$R^5$ denotes an organic radical of valency e, linked through a carbon atom thereof other than the carbon atom of a carbonyl group.

More particularly, when c is zero, $R^5$ may denote the residue, containing from 1 to 60 carbon atoms, of an alcohol or phenol having e hydroxyl groups.

$R^5$ may thus represent an aromatic, araliphatic, alkaromatic, cycloaliphatic, heterocyclic, or heterocycloaliphatic group, such as an aromatic group containing only one benzene ring, optionally substituted by chlorine, bromine or an alkyl group of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chlorine, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae $-C_6H_4C(CH_3)_2C_6H_4-$, in which case e is 2, and $-C_6H_4(CH_2C_6H_3-)_f-CH_2C_6H_4-$ where f is 1 or 2, in which case e is 3 or 4, and the aliphatic groups of formula $-CH_2CHCH_2-$ or $-CH_2CH(CH_2)_3CH_2-$, in which case e is 3, or of formula $-(CH_2)_4-$, $-CH_2CH=CHCH_2-$, $-CH_2CH_2OCH_2CH_2-$, or $-(CH_2CH_2O)_2CH_2CH_2-$, in which case e is 2.

When c is 1, $R^5$ may represent the residue of an acid having e carboxyl groups, preferably a saturated or ethylenically unsaturated, straight chain or branched aliphatic hydrocarbon group of from 1 to 20 carbon atoms, which may be substituted by chlorine atoms or hydroxyl groups and which may be interrupted by ether oxygen atoms and/or by carbonyloxy ($-COO-$) groups, an ethylenically unsaturated straight chain or branched aliphatic hydrocarbon group of from 50 to 100 carbon atoms, or a saturated or ethylenically unsaturated cycloaliphatic or aliphatic-cycloaliphatic hydrocarbon group of from 4 to 60 carbon atoms, which may be substituted by chlorine atoms, or an aromatic hydrocarbon group of from 6 to 12 carbon atoms which may be substituted by chlorine or bromine atoms.

Further preferred compounds where c is 1 are those in which $R^5$ represents a saturated or ethylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms.

Specific examples of these residues of carboxylic acids are those of the formula $-CH_2CH_2-$, $-CH=CH-$, $+CH_2CH=CH-CH_2+_n$ and $-C_6H_4-$ where e is 2 and n is an integer of from 1 to 25.

Specific examples of suitable compounds of formula IV are 1,4-bis(2-hydroxy-3-(acryloyloxy)propoxy)butane, poly(2-hydroxy-3-(acryloyloxy)propyl)ethers of bis(4-hydroxyphenyl)methane (bisphenol F), 2,2-bis(4-hydroxyphenyl)propane (bisphenol A) and phenol-formaldehyde novolaks, bis(2-hydroxy-3-acryloyloxypropyl)adipate, bis(2-hydroxy-3-acryloxypropyl)esters of carboxy-terminated polybutadienes, and the methacryloyloxy analogues of these compounds.

Still other suitable esters are acrylate-urethanes and acrylate-ureides of formula

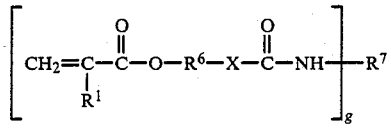

where $R^1$ has the meaning assigned above, $R^6$ denotes a divalent aliphatic, cycloaliphatic, aromatic, or araliphatic group, bound through a carbon atom or carbon atoms thereof to the indicated $-O-$ atom and $-X-$ atom or group, X denotes $-O-$, $-NH-$, or $-N(alkyl)-$, in which the alkyl radical has from 1 to 8 carbon atoms, g is an integer of at least 2 and at most 6, and $R^7$ denotes a g-valent cycloaliphatic, aromatic, or araliphatic group bound through a carbon atom or carbon atoms thereof to the indicated NH groups.

Preferably $R^6$ denotes a divalent aliphatic group of 2 to 6 carbon atoms and $R^7$ denotes one of the following:

a divalent aliphatic group of 2 to 10 carbon atoms, such as a group of formula $-(CH_2)_6-$,
$-CH_2C(CH_3)_2CH_2CH(CH_3)(CH_2)_2-$, or $-CH_2CH(CH_3)CH_2C(CH_3)_2(CH_2)_2-$; or a phenylene group, optionally substituted by a methyl group or a chlorine atom; a naphtylene group; a group of formula $-C_6H_4C_6H_4-$; $-C_6H_4CH_2C_6H_4-$, or
$-C_6H_4C(CH_3)_2C_6H_4-$;

or a mononuclear alkylcycloalkylene or alkylcycloalkylalkylene group of from 6 to 10 carbon atoms, such as a methylcyclohex-2,4-ylene, methylcyclohex-2,6-ylene, or 1,3,3-trimethylcyclohex-5-ylenemethyl group.

Specific examples of compounds of formula V are 2,4- and 2,6-bis(2-acryloyloxyethoxycarbonamido)toluene and the corresponding methacryloyloxy compounds.

Further suitable acrylic esters are those of formula

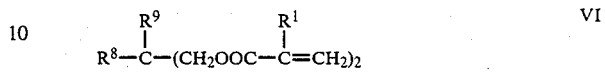

where $R^1$ has the meaning assigned above, $R^8$ denotes $CH_3-$, $C_2H_5-$, $-CH_2OH$ or $CH_2=C(R^1)COOCH_2-$, and $R^9$ denotes $-CH_2OH$ or $-CH_2OOC-C(R^1)=CH_2$, especially 1,1,1-trimethylolpropane triacrylate, pentaerythritol tetraacrylate and the corresponding methacrylates.

Still further suitable acrylic esters are those of formula

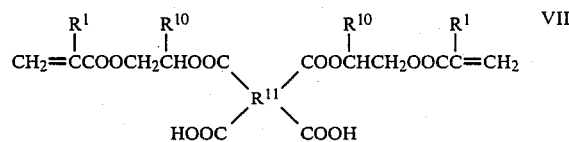

where $R^1$ has the meaning assigned above, $R^{10}$ denotes $-H$, $-CH_3$ or $-CH_2Cl$, and $R^{11}$ denotes a tetravalent residue, containing up to 20 carbon atom and one or more carbocyclic rings, of a tetracarboxylic acid after removal of four carboxyl groups, each indicated pair of groups $-COOCH(R^{10})CH_2OOCC(R^1)=CH_2$ and $-COOH$ being directly linked to adjacent carbon atoms.

Preferably, $R^1$ and $R^{10}$ are $-H$ or $-CH_3$ and $R^{11}$ is the residue of an aromatic tetracarboxylic acid having one or two benzene rings, especially pyromellitic acid or benzophenone-3,3',-,4'-tetracarboxylic acid.

Compounds of formula VII can be obtained by reaction of a hydroxyethyl or hydroxypropyl ester of acrylic or methacrylic acid with an aromatic tetracarboxylic acid dianhydride, such as the dianhydride of pyromellitic acid or benzophenone-3,3',4,4'-tetracarboxylic acid.

Any of the above acrylic esters may be used in combination and may be mixed with a diluent, particularly an acrylic ester having a low viscosity such as an alkyl, hydroxyalkyl or cyanoalkyl acrylate or methacrylate.

The free radical initiator (ii) and accelerator (iii) used in the anaerobic mixture (A) may be any of those known to be suitable for use in anaerobically polymerisable compositions. Thus, suitable initiators include hydroperoxides, peroxides, alpha-hydroxysulphones, aromatic alpha-aminosulphones and mixtures of an organic amine oxide and a $HN=$ acidic compound such as a sulphonic or carboxylic acid hydrazide, sulphimide, disulphonyl imide or acyl cyanamide. Hydroperoxides, peroxides and mixtures of an amine oxide and a sulphonic acid hydrazide are preferred polymerisation initiators. Organic hydroperoxides which may be used include those of formula $R^{12}OOH$, where $R^{12}$ is a monovalent organic radical containing up to 18 carbon atoms, especially an alkyl, aryl, or aralkyl radical containing from 4 to 13 carbon atoms. Typical hydroperoxides are ethyl methyl ketone hydroperoxide, tert.butyl hydroperoxide, cumene hydroperoxide, and hydroperoxides formed by the oxygenation of cetene or cyclohexene, tert.butyl hydroperoxide and cumene hydroperoxide being especially effective. A range of organic peroxides may be used, such as 2,5-dimethyl-2,5-bis(-benzoylperoxy)hexane, 2,5-dimethyl-2,5-bis(tert.butylperoxy)hexane, di-tert.butyl peroxide, dihexylene glycol peroxide, tert.butyl cumyl peroxide, isobutyl methyl ketone peroxide, and also peresters such as tert.butyl peracetate, tert.butyl perbenzoate, and tert.butyl perphthalate. Preferred amine oxides, which can also be used as their salts, are oxides of aromatic tertiary amines such as N,N-dimethyl-p-toluidine and N,N-dimethyl-aniline. Preferred hydrazides are those of aromatic sulphonic acids such as benzene-sulphonic acid and p-toluenesulphonic acid.

Suitable accelerators (iii) include aliphatic amines having at least two primary aliphatic amino groups and their ketimines, such as diethylenetriamine or triethylenetetramine and their ketimines with isobutyl methyl ketone; polyisocyanates, such as toluene-2,4-diisocyanate:aldimines, tertiary amines, such as N,N-dimethylbenzylamine, N,N-dimethyl-p-toluidine and triethylamine; imides and sulphimides, such as o-benzoic sulphimide; dithiocarbamates; amides and thioamides such as formamide; thiazoles such as 2-mercaptobenzthiazole; phosphoryl hydrazines such as diethyl phosphoro hydrazidate; ascorbic acid; organic phosphites; quaternary ammonium salts and bases; salts of transition metals; and thioureas. In a particularly preferred embodiment, the accelerator is a mixture of a sulphimide such as o-benzoic sulphimide and an aromatic tertiary amine such as N,N-dimethyl-p-toluidine, or a mixture of a phosphoryl hydrazine, such as diethyl phosphoryl hydrazidate and an aromatic tertiary amine such as N,N-dimethyl-p-toluidine.

The amount of polymerisation initiator (ii) may vary between 0.01% and 15% by weight of the ester (i), quantities of from 1% to 10% by weight generally being used. The amount of accelerator (iii) used is also preferably from 1 to 10% by weight of the ester (i).

Where a one part composition is desired, i.e. one which does not have to be prepared by mixing different components immediately prior to use, the use as ester (i), initiator (ii), and accelerator (iii) of compounds which react with epoxide resins at ambient temperature should be avoided.

Epoxide resins that may be used in the compositions of the present invention are any compounds containing, per average molecule, more than one 1,2-epoxide group. Such resins may be aliphatic, aromatic, araliphatic, cycloaliphatic or heterocyclic, the epoxide groups being terminal or forming part of an alicyclic or heterocyclic ring. Usually, the epoxide groups are present as glycidyl groups in glycidyl ethers or esters, or as N-glycidyl derivatives of heterocyclic amines, amides and imides. Such resins are well known and are commercially available.

Preferred epoxide resins are those containing at least two groups of formula

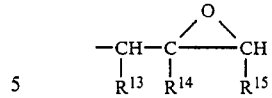

VIII directly attached to an atom or atoms of oxygen, nitrogen, or sulphur, where either $R^{13}$ and $R^{15}$ each represent a hydrogen atom, in which case $R^{14}$ denotes a hydrogen atom or a methyl group, or $R^{13}$ and $R^{15}$ together represent —CH$_2$CH$_2$—, in which case $R^{14}$ denotes a hydrogen atom.

As examples of such resins may be mentioned polyglycidyl and poly(beta-methylglycidyl)esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl)ethers obtainable by reaction of a compound containing at least two free alcoholic hydroxyl and/or phenolic hydroxyl groups per molecule with the appropriate epichlorohydrin under alkaline conditions, or, alternatively, in the presence of an acidic catalyst and subsequent treatment with alkali. These ethers may be made from acyclic alcohols such as ethylene glycol, diethylene glycol, and higher poly(oxyethylene)glycols, propane-1,2-diol and poly(oxypropylene)glycols, propane-1,2-diol and poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerthritol, sorbitol, and polyepichlorohydrins; from cycloaliphatic alcohols such as recorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as recorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, phenol substituted in the ring by chlorine atoms or by alkyl groups each containing up to nine carbon atoms, such as 4-chlorophenol, 2-methylphenol, and 4-tert.butylphenol, or a bisphenol such as those described above.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, m- xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Examples of epoxide resins having groups of formula VIII where $R^{13}$ and $R^{15}$ conjointly denote a —$CH_2CH_2$— group are bis(2,3-epoxycyclopentyl)ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl-5,5-dimethylhydantoin, and 2-glycidyloxy-1,3-bis(5,5-dimethyl-1-glycidylhydantoin-3-yl)propane.

If desired, a mixture of epoxide resins may be used.

Especially preferred epoxide resins are polyglycidyl ethers of bisphenols such as 2,2-bis(4-hydroxyphenyl)-propane or bis 4-hydroxyphenyl)methane, of novolaks formed from formaldehyde and a phenol, or of the aliphatic diols mentioned above, in particular butane-1,4-diol, diglycidyl esters of the dicarboxylic acids mentioned above and N,N'-diglycidyl derivatives of hydantoins.

The basic curing agents useful as component (C) of the composition may be of any of the known basic curing agents. These can be of the type which effect curing at room temperature or, preferably, they are of the type which have to be heated to effect cure. Suitable room temperature-type basic curing agents include aliphatic, cycloaliphatic or heterocyclic, primary, secondary or tertiary amines, for example, aliphatic polyamine including alkylene diamines such as ethylene diamine, propane-1,2-diamine, propane-1,3-diamine, hexamethylenediamine, and N,N-dimethylpropylene-1,3-diamine, polyalkylene polyamines such as diethylenetriamine, triethylenetetramine, and tetraethylenepentamine, and alkanolamines such as ethanolamine, diethanolamine, triethanolamine and N-(2-hydroxyethyl)-diethylenetriamine; cycloaliphatic polyamines such as bis(4-aminocyclohexyl)methane, bis(4-amino-3-methylcyclohexyl)methane and isophoronediamine; heterocyclic polyamines, for example N-alkylpiperazines such as N-(2-aminoethyl)piperazine; and polyaminoamides such as reaction products of aliphatic polyamines and dimerised or trimerised unsaturated fatty acids. Although these curing agents are room temperature curing agents, cure of compositions containing them can be accelerated by heat.

Suitable heat-activated or latent basic curing agents include aromatic primary and secondary amines, for example, phenylenediamines, substituted phenylene diamines such as 2,4- and 2,6-diethyl-3,5-diaminotoluene, bis(aminophenyl)methanes such as bis(4-aminophenyl)methane, bis(aminophenyl)sulphones such as bis(4-aminophenyl)sulphone, and bis(aminophenyl)ketones such as bis(4-aminophenyl)ketone; imidazole and substituted imidazoles such as 2-methylimidazole, 2-phenylimidazole, 1-benzyl-2-methylimidazole and 1-cyanoethyl-2-methylimidazole; amides including substituted ureas, especially aromatic group-substituted ureas such as N-(4-chlorophenyl)-N',N'-dimethylurea, N-(2-hydroxyphenyl)-N',N'-dimethylurea, N-(3-chloro-4-methylphenyl)-N',N'-dimethylurea and 2,4-bis(N,N-dimethylureido)toluene; amidines such as dicyandiamide and 1-cyano-3-(lower alkyl)guanidines, for example the 3-methyl, 3,3-dimethyl or 3,3-diethyl compounds; and complexes of boron trichloride with a tertiary aliphatic, cycloaliphatic or heterocyclic amine, particularly trimethylamine or octyldimethylamine.

Polymercaptans useful as component (C) include mercaptan-terminated polyoxyalkylene ethers and esters. The ethers are usually obtained from polyoxyalkylene glycols and triols by reaction first with epichlorohydrin and then with sodium hydrosulphide, or with an alkylene oxide followed by sodium hydrosulphide. The esters are usually esters of a polyoxyalkylene glycol or triol with a mercaptan carboxylic acid such as thioglycolic acid or 2- or 3-mercaptopropionic acid. Other suitable polymercaptans are esters of such mercaptancarboxylic acids with polyhydric alcohols having from 2 to 6 carbon atoms, for example, ethylene and propylene glycols, glycerol, 1,1,1-trimethylolpropane and pentaerythritol.

Polyhydric phenol curing agents useful as component (C) include mononuclear phenols such as resorcinol, polynuclear phenols, particularly bisphenols, such as bisphenol F and bisphenol A, and novolak resins derived from a mononuclear or polynuclear phenol, especially phenol itself or bisphenol A, and formaldehyde.

Curing accelerators conventionally used with the above types of curing agent may be included in the compositions of this invention. For instance, when dicyandiamide is used as the curing agent, a substituted urea such as N-(4-chlorophenyl)-N',N'-dimethylurea or N-(3-chloro-4-methylphenyl)-N',N'-dimethylurea can be used as an accelerator, and when a polymercaptan is used as the curing agent, a Mannich base such as 2,4,6-tris(dimethylaminomethyl)phenol can be used as accelerator.

The compositions of this invention may also include conventional compounding ingredients such as free radical polymerisation inhibitors, particularly p-benzoquinone, stabilisers tougheners and fillers.

The weight ratio of the free radical-polymerizable compound to epoxide resin is generally within the range 1:0.5–10, especially 1:0.2-2. The weight of curing agent is that which is conventional for epoxide resin formulations, and may be varied in accordance with the precise nature of the epoxide resin and the curing agent. Typically 0.01 part to 0.5 part by weight of curing agent is used per part of epoxide resin.

When a composition of this invention is placed on an impermeable surface, and a mating surface is applied, anaerobic polymerisation of the mixture will occur within a short space of time, usually within about 10 minutes. The two surfaces will then be held together by the polymerised composition whilst complete cure of the mixture takes place, either at room temperature or at elevated temperatures. Accordingly this invention further provides a method of effecting adhesion between two impervious surfaces that comprises applying to at least one of the surfaces a composition of the invention, applying a second surface to the composition and holding the surfaces together to prevent ingress of oxygen until the composition solidifies. Further treatment of the adhering surfaces may vary according to the exact nature of the composition, but usually they are heated to a temperature of 50°–180° C., preferably 50° to 150° C., to effect rapid and complete cure of the composition.

Where compositions have a low viscosity prior to cure, it is sometimes advantageous to insert a resin-absorbing material between the mating surfaces to prevent substantial amounts of the composition from being expelled from between them. Suitable material must not be so thick that it interferes with the anaerobic cure and lowers the ultimate strength of the bond. Usually a woven or non-woven cloth is used, but tissue paper has also been found to be satisfactory. Preferably a thin woven nylon scrim is used.

The following Examples illustrate the invention, all parts being by weight. The resins used in these Examples are as follows:

Epoxide I This denotes a resin made from epichlorohydrin and bisphenol A and having a viscosity at 21° C. of about 7.6 Pa s and an epoxide content within the range 1.4 to 1.7 equivalents/kg.

Epoxide II This denotes a glycidylated novolac of bisphenol A having a softening point of 72° C. and an epoxide content of 4.7 equivalents/kg.

Epoxide III This denotes 1,4-butanediol diglycidyl ether, having an epoxide content of 8.3 equivalents/kg.

Epoxide IV This denotes bisphenol A diglycidyl ether having an epoxide content of 5.2 equivalents/kg.

Acrylic ester I This denotes 1,4-bis(2-hydroxy-3(methacryloyloxy)propoxybutane.

Acrylic ester II This denotes a di-2-hydroxy-3(acryloyloxy)-propyl ether of bisphenol A, prepared by reaction of 1 mole of Epoxide I with 2 moles of acrylic acid.

Acrylic ester III This denotes trimethylolpropane trismethacrylate.

Acrylic ester IV This denotes the dimethacrylate of a polyethylene glycol having an average molecular weight of about 200.

Acrylic ester V This denotes a bis(2-hydroxy-3-acryloyloxypropyl) ester of a carboxy-terminated polybutadiene liquid rubber of molecular weight approximately 1300, available under the designation "Hycar VTBN 1300×22" from B. F. Goodrich Chemical Company, 6100 Oak Tree Boulevard, Cleveland, Ohio, U.S.A. 'Hycar' is a registered trade mark.

EXAMPLE 1

Epoxide I (2.5 parts) and Epoxide II (7.5 parts) are mixed at 60° C. in Acrylic ester I (10.0 parts). The mixture is cooled and to it are added Acrylic ester III (4.0 parts), cumene hydroperoxide (0.6 part), o-benzoic sulphimide (0.1 part), N,N-dimethyl-p-toluidine (0.04 part), dicyandiamide (1.0 part), and N-(4-chlorophenyl)-N',N'-dimethylurea (0.5 part). The mixture is passed through a triple roll mill to give a homogeneous composition. This composition is stable for several months when stored in small quantities in half-filled polyethylene containers.

The formulation is coated onto pre-cleared steel sheets and other pre-cleaned steel sheets are placed on top, making 2.5 cm×2.5 cm lap joints. The joints are clamped together and, after 5 minutes, some cannot be separated by hand. After 10 minutes at room temperature all of the joints resist attempts at separation by hand. The average lap shear strength of 6 joints taken at random after 1 hour is 0.2 MN/m². The clamps are removed from the other samples and they are heated at 120° C. The average lap shear strength after 1 hour is 7.2 MN/m² and after a further hour it is 13.7 MN/m², both these figures being the average of 6 samples.

EXAMPLE 2

Epoxide I (2.5 parts) and Epoxide II (7.5 parts) are mixed at 60° C. in Acrylic ester I (10 parts) and Acrylic ester III (4.0 parts). The mixture is cooled and to it are added cumene hydroperoxide (0.6 part), o-benzoic sulphimide (0.1 part), N,N-dimethyl-p-toluidine (0.04 part), and a mixture of 2,4- and 2,6-diethyl-3,5-diamino toluene (2.5 parts). This formulation is used to prepare lap joints between steel sheets as described in Example 1. A thin woven nylon scrim is used between the steel sheets to prevent elimination of uncured mixture when clamping first takes place. The joint becomes impossible to open by hand within 15 minutes at 23° C. Thermal cure at 120° for 1 hour gives a lap shear strength of 11.1 MN/m², while this is increased to 19.7 MN/m² when the joints are heated for a further hour at 150° C., both these figures being the average value obtained from 6 joints.

EXAMPLE 3

Epoxide I (2.5 parts) and Epoxide II (7.5 parts) are mixed at 60° c. in Acrylic ester I (10 parts) and Acrylic ester III (4.0 parts). On cooling, the mixture is treated with cumene hydroperoxide (0.6 part), o-benzoic sulphimide (0.1 part), N,N-dimethyl-p-toluidine (0.04 part) and bis(4-aminophenyl)-methane (2.7 parts). This formulation is used to prepare lap joints as described in Example 1. These joints have a lap shear strength of 0.2 MN/m² after 30 minutes at 23° C., rising to 10.2 MN/m² after 1 hour at 120° C. and 17.9 MN/m² after a further hour at 150° C., all these figures being the average of 6 replicates.

EXAMPLE 4

Epoxide III (8.0 parts), Acrylic ester II (4.8 parts) and Acrylic ester III (0.4 part) are mixed at 60° C. and cooled. To the resultant solution are added cumene hydroperoxide (0.6 part), o-benzoic sulphimide (0.1 part), N,N-dimethyl-p-toluidine (0.05 part), dicyandiamide (1.6 parts), and N-(4-chlorophenyl), N',N'-dimethylurea (0.8 part). The mixture is then passed through a triple roll mill to give a homogenous paste that remained uncured for several months when stored at room temperature in small quantities in half-filled polyethylene bottles.

Lap joints are prepared as described in Example 1, using a thin nylon scrim between the surfaces to prevent excessive loss of uncured composition. The joints are impossible to open by hand after 10 minutes at 23° C. and after a thermal cure for 1 hour at 120° C. the lap shear strength of six such joints has an average value of 21.6 MN/m².

EXAMPLE 5

The following compositions are prepared:

Mixture A

Acrylic ester I: 96.7 parts
Cumene hydroperoxide: 3.0 parts
o-benzoic sulphimide: 0.2 part
N,N-dimethyl-p-toluidine: 0.1 part This is a conventional anaerobically-curing adhesive mixture.

Mixture B

Bisphenol A diglycidyl ether, epoxide content 5.2 equivalents/kg: 89.4 parts 1,4-Butanediol diglycidyl ether, epoxide: content 8.55 equivalents/kg: 6.5 parts Mercaptan-terminated polyoxypropylene glycol, mol. wt. 800: 45 parts 2,4,6-tris(dimethylaminomethyl)phenol: 6.3 parts Silica flour, sufficient to give a final viscosity of 25 Pa s.

This is a rapid-setting epoxide adhesive formulation.

Mixture C

Mixture A 1 part
Mixture B 2 parts

These Mixture C is applied to the threads of 9,5 mm BSF steel bolts and the nuts are then screwed onto the mixture.

The time taken for the nuts to be impossible to remove using the fingers only is noted. The assemblies are then placed in an oven at 120° C. for 2 hours, and the torque necessary to remove the nuts is measured. The results are as follows, all figures being the average for 6 replicates.

| Mixture | Setting time (mins) | Final torque (Nm) |
|---|---|---|
| C | 20 | 49.8 |

EXAMPLE 6

The following are mixed at room temperature to give

Mixture A

Acrylic ester V: 10 g
cyanoethyl acrylate: 10.0 g
Epoxide IV: 20.0 g
glycidyl methacrylate: 2.0 g Mixture A (20.0 g) is mixed with dicyandiamide (0.4 g) and N-(3-chloro-4-methylphenyl)-N',N'-dimethylurea (0.4 g) and the mixture milled in a triple-roll mill until homogeneous. The milled product is then treated with tert.butyl cumyl peroxide (0.5 g), N,N-dimethyl-p-toluidine (0.1 g), o-benzoic sulphimide (0.1 g) and diethyl phosphoro hydrazidate (0.2 g) and mixed until homogeneous.

This formulation is used to prepare lap joints between steel sheets as described in Example 1, a thin woven nylon scrim being used to prevent elimination of uncured mixture when clamping first takes place. After 2 hours at 20° C. the lap shear strength is 6.2 MN/m², and after being heated at 120° C. for 1 hour this strength increased to 22.7 MN/m². These figures are the average values for six replicates.

EXAMPLE 7

Example 6 is repeated, replacing the tert.butyl cumyl peroxide by an equal weight of cumene hydroperoxide. The lap shear strength after 10 minutes at 20° C. is 5.6 MN/m², and, after 1 hour at 120° C. this strength increases to 20.7 MN/m². These figures are the average values for six replicates.

EXAMPLE 8

A composition is prepared containing the following:
Acrylic ester IV: 9.2 parts
cumene hydroperoxide: 0.5 part
N,N-dimethyl-p-toluidine: 0.1 part
diethyl phosphoro hydrazidate: 0.2 part
p-benzoquinone: 0.002 part Epoxide IV: 9.3 parts
dicyandiamide: 0.4 part
N-(4-chlorophenyl)-N',N'-dimethylurea: 0.4 part The formulation is coated onto aluminum sheets, precleaned with acetone, to make 2.5×2.5 cm lap joints, using a thin nylon scrim between the surfaces. The joints are clamped together for 15 minutes at 20° C., and have a lap shear strength of 0.31 MN/m². After heating at 120° C. for 1 hour the lap shear strength rises to 5.8 MN/m².

The experiment is repeated, using steel sheets in place of aluminium. Lap shear strength after 10 minutes at 20° C. is 0.54 MN/m² and after heating at 120° C. for 1 hour it is 6.58 MN/m². These figures are the average values for six replicates.

EXAMPLE 9

Example 7 is repeated, but cure is effected by heating at 150° C. for 2 hours. The average lap shear strength of the joints is 28.5 MN/m².

When the joints are subjected to 1 hour in water in a pressure cooker at 105 kN/m², the average lap shear strength falls to 16.3 MN/m². All of these figures are the average values for six replicates.

EXAMPLE 10

A composition is prepared containing a glycidylated phenol-formaldehyde novolac having a softening point of 30°-45° C. and an epoxide content of 5.6 equivalents/kg (12.5 parts), a phenol-formaldehyde novolac having a phenol:formaldehyde ratio of 1:0.72 and a number average molecular weight of 420 (8.2 parts) as curing agent, tripropyleneglycol diacrylate (8.2 parts), 2-carboxyethyl acrylate (12.5 parts), cumene hydroperoxide (0.3 parts), o-benzoic sulphimide (0.05 part), N,N-dimethyl-p-toluidine (0.01 part) and diethyl phosphoro hydrazidate (0.05 part). This composition is coated onto precleaned aluminum sheets and the coated sheets are clamped together, using a thin nylon scrim between the sheets, at ambient temperature for 2 hours to form a lap joint. After curing for 1 hour at 170° C. and cooling to room temperature, the lap shear strength is 4.3 MN/m² (average for six replicates).

What is claimed is:

1. A method of effecting adhesion between two impervious surfaces that comprises applying to at least one of the surfaces a curable composition which is polymerizable by excluding oxygen therefrom and which is further curable by heating, comprising (A) an anaerobically polymerizable mixture which is stable in oxygen, but is polymerizable by excluding oxygen therefrom, comprising (i) an acrylic ester of formula II, IV or VI

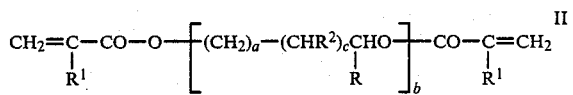

where
$R^1$ denotes —H, —Cl, —CH$_3$ or —C$_2$H$_5$,
R denotes H, —CH$_3$, —C$_2$H$_5$, —CH$_2$OH, or —CH$_2$O—CO—C(R$^1$)=CH$_2$
$R^2$ denotes H, OH, or —OCO—C(R$^1$)=CH$_2$
a is an integer of from 1 to 8,
b is an integer of from 1 to 20, and
c is zero or 1,

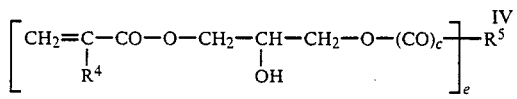

$$\left[ CH_2=\underset{R^4}{C}-CO-O-CH_2-\underset{OH}{CH}-CH_2-O-(CO)_c \right]_e R^5 \quad \text{IV}$$

where
c is zero or 1,
e is 2, 3 or 4,
$R^4$ denotes —H or —$CH_3$, and
$R^5$ denotes an organic radical of valency e, linked through a carbon atom thereof other than a carbon atom of a carbonyl group.

$$R^8-C(R^9)_{13}(CH_2OCO-C(R^1)=CH_2)_2 \quad \text{VI}$$

where
$R^1$ denotes —H, —Cl, —$CH_3$ or —$C_2H_5$,
$R^8$ denotes $CH_3$—, $C_2H_5$—, —$CH_2OH$ or $CH_2$=$C(R^1)COOCH_2$—, and $R^9$ denotes —$CH_2OH$ or —$CH_2OOC$—$C(R^1)$=$CH_2$.

(ii) an organic free radical initiator, and
(iii) an accelerator of free radical polymerization which is benzoic sulfimide, diethyl phosphoro hydrazidate, or a mixture of benzoic sulfimide and N,N-dimethyl-p-toluidine,
(B) an epoxide resin, and
(C) a basic curing agent for epoxide resins which is dicyandiamide or an imidazole, wherein the composition is subject to anaerobic polymerization by excluding oxygen therefrom and curing either at room temperature or at elevated temperature, applying a second surface to the composition, and holding the surfaces together to prevent the ingress of oxygen until the composition solidifies.

2. A method according to claim 1, in which the surfaces are further treated by heating to a temperature of 50°–180° C. to effect complete cure of the composition.

* * * * *